(12) United States Patent
Klenke et al.

(10) Patent No.: US 9,941,653 B2
(45) Date of Patent: Apr. 10, 2018

(54) OPTICAL ARRAY COMPRISING A BEAM SPLITTER

(71) Applicants: Fraunhofer-Gesellschaft zur Forderung der angewandten Forschung e.V., Munich (DE); Friedrich-Schiller-Universitat Jena, Jena (DE)

(72) Inventors: Arno Klenke, Jena (DE); Jens Limpert, Jena (DE); Hans-Jurgen Otto, Schramberg (DE); Andreas Tunnermann, Weimar (DE)

(73) Assignees: FRAUNHOFER-GESELLSCHAFT ZUR FÖRDERUNG DER ANGEWANDTEN FORSCHUNG E.V., München (DE); FRIEDRICH-SCHILLER-UNIVERSITÄT JENA, Jena (DE)

( * ) Notice: Subject to any disclaimer, the term of this patent is extended or adjusted under 35 U.S.C. 154(b) by 0 days.

(21) Appl. No.: 15/116,175

(22) PCT Filed: Feb. 3, 2015

(86) PCT No.: PCT/EP2015/052204
§ 371 (c)(1),
(2) Date: Aug. 2, 2016

(87) PCT Pub. No.: WO2015/114165
PCT Pub. Date: Aug. 6, 2015

(65) Prior Publication Data
US 2017/0179666 A1   Jun. 22, 2017

(30) Foreign Application Priority Data
Feb. 3, 2014   (DE) ..................... 10 2014 001 252

(51) Int. Cl.
*H01S 3/00*   (2006.01)
*H01S 3/23*   (2006.01)
(Continued)

(52) U.S. Cl.
CPC ........ *H01S 3/0078* (2013.01); *G02B 27/1006* (2013.01); *G02B 27/145* (2013.01);
(Continued)

(58) Field of Classification Search
CPC .... H01S 3/0078; H01S 3/0092; H01S 3/1301; H01S 3/2308; H01S 3/2383; G02B 27/1006; G02B 27/145
See application file for complete search history.

(56) References Cited

U.S. PATENT DOCUMENTS 4,492,436 A * 1/1985 Bergmann ............. G02B 27/12
                                                   359/485.02
4,757,268 A * 7/1988 Abrams ............. H01S 3/10076
                                                   359/333

(Continued)

OTHER PUBLICATIONS

International Search Report of the International Searching Authority with English Translation issued in the corresponding PCT International Application No. PCT/EP2015/052204, dated May 19, 2015 (7 pages).

(Continued)

*Primary Examiner* — Daniel Petkovsek
(74) *Attorney, Agent, or Firm* — Raymond R. Ferrera; Adams and Reese LLP

(57) ABSTRACT

The invention relates to an optical array comprising a splitting element (1) which splits an input beam (E) into at least two partial beams (T1, T2, T3, T4), at least one optical element (V1, V2, V3, V4, MV) through which at least one of the partial beams (T1, T2, T3, T4) propagates, and at least one combining element (4) which spatially superimposes the partial beams (T1, T2, T3, T4) in one output beam (A). The object of the invention is to provide an optical array which (Continued)

is improved over the prior art and which permits effective and simple splitting of the input light beam, in particular a laser beam with pulsed or continuous emission. The invention achieves this object in that the splitting element (1) and/or the combining element (4) each have a partially reflective element (2, 2') which reflects the radiation of the input beam (E) or of the output beam (A) two or more times, wherein the partially reflective element (2, 2') has zones (a, b, c, d) of different reflectivity.

19 Claims, 1 Drawing Sheet

(51) Int. Cl.
    *H01S 3/13*     (2006.01)
    *G02B 27/14*     (2006.01)
    *G02B 27/10*     (2006.01)

(52) U.S. Cl.
    CPC .......... *H01S 3/0092* (2013.01); *H01S 3/1301* (2013.01); *H01S 3/2308* (2013.01); *H01S 3/2383* (2013.01)

(56) References Cited

U.S. PATENT DOCUMENTS

| | | | |
|---|---|---|---|
| 5,121,400 A * | 6/1992 | Verdiell | H01S 3/2383 372/108 |
| 6,480,327 B1 * | 11/2002 | Betin | H01S 3/06754 359/338 |
| 6,665,320 B1 * | 12/2003 | Arbore | H01S 5/4062 372/20 |
| 2007/0086010 A1 * | 4/2007 | Rothenberg | B23K 26/0613 356/450 |
| 2009/0245295 A1 * | 10/2009 | Ishaaya | H01S 3/07 372/18 |
| 2013/0235448 A1 * | 9/2013 | Klenke | H01S 3/0057 359/341.1 |

OTHER PUBLICATIONS

Written Opinion of the International Search Authority (Form PCT/ISA/237) with English Translation issued in the corresponding PCT International Application No. PCT/EP2015/052204, dated May 19, 2015 (15 pages).

International Preliminary Report on Patentability Chapter I issued in the corresponding PCT International Application No. PCT/EP2015/052204, dated Aug. 9, 2016 (8 pages).

Amiel A. Ishaaya, Nir Davidson and Asher A. Friesen, Passive Laser Beam Combining With Intracavity Interferometric Combiners, IEEE Journal of Selected Topics in Quantum Electronics, vol. 15, No. 2, Mar./Apr. 2009, pp. 301-311 (11 pages).

* cited by examiner

OPTICAL ARRAY COMPRISING A BEAM SPLITTER

The invention relates to an optical array, having
a splitting element which splits an input beam into at least two partial beams,
at least one optical element through which at least one of the partial beams propagates, and
at least one combining element which spatially superposes the partial beams in one output beam.

The invention furthermore relates to an optical splitting element for splitting an input beam into a plurality of partial beams, having a partially reflective element.

Such optical arrays and splitting elements can be used, for example, in laser systems.

The efficiency of optical elements, for example of laser amplifiers, spectral broadening elements, transport fibers, optics (for example mirror surfaces, substrates, lenses) etc., is limited by various physical effects. A distinction must be made here between the average power and the pulse peak power that is important in pulsed systems. One limitation is due to thermal effects that occur starting from a specific average output and depend on the geometry of the element as well as external influences. One example of these effects which can be cited is, in classical solid-state lasers, a change in the output beam due to the occurrence of a thermal lens. In fiber amplifiers, on the other hand, it is the occurrence of mode instabilities due to thermal effects that represents a limitation of the attainable average output power.

Moreover, nonlinear effects occur at high pulse peak powers in the medium, such as for example self-phase modulation. These nonlinear effects cause a spatial or temporal change in the phase of the laser radiation.

For this reason, the pulse may deform in the temporal domain, which is not desired and leads to a reduction in the pulse quality and an increase in pulse duration especially in pulses having a high bandwidth. In the spatial domain, these nonlinear effects can lead to self-focusing of the beam, which can quickly cause destruction of the respective medium. In addition to the limitation of the maximum possible pulse peak power in connection with a given pulse form or pulse length, nonlinear effects also cause a limitation of the maximum pulse energy. Damage to the surfaces of the medium at high pulse peak powers or pulse energies is additionally possible, which can likewise represent a limitation.

In elements for spectral broadening, nonlinear effects are taken advantage of. Limiting physical effects occur here too. If solid-state materials in the form of crystals or fibers are used as nonlinear media, a limit for the pulse peak power then arises especially owing to the already described self-focusing. If capillaries filled with noble gas are used as the nonlinear medium, significantly higher pulse peak powers are possible, with these also being attained already with existing laser systems. Moreover, the high intensity can result in ionization of the gases, which is not desired.

Various approaches for overcoming these limitations and for increasing the attainable average output power are known from the prior art.

For example, approaches for avoiding limitations in respect of the optical gain and the spectral broadening exist.

By increasing the beam area, it is possible to reduce the output density or the pulse peak intensities in the optical elements used. One example when using fiber-optic elements is the use of what are known as large-mode-area fibers. This allows a corresponding increase of the pulse peak power due to the greater beam area without disadvantageous effects.

By using, for example, circularly polarized pulses, the strength of the Kerr effect can be lowered, which is responsible among other things for the occurrence of the self-focusing.

By manipulating the spectral phases or amplitudes, it is possible to compensate for a degradation of the pulse quality due to nonlinear effects.

In what is known as divided pulse amplification (DPA) or divided pulse nonlinear compression (DPNLC), a pulse is split into a plurality of temporarily separate pulse replicas. After the amplification or broadening of the pulses of the pulse train, a recombination in one pulse is effected. Due to the temporal split, the pulse peak power of each pulse replica is less than that of an individual pulse.

Spatially separated amplifiers or broadening elements can be used, where splitting of the input beam into a plurality of beams is carried out using beam splitters. The plurality of beams are amplified or spectrally broadened in a plurality of spatially separate, independent optical elements/channels and subsequently recombined into one beam. Here, a distinction must be made between combination of signals of identical or different spectra. In the case of the spectrally identical combination, the identical spectral components propagate in the different channels, only a splitting of the power occurs at the beam splitter. In the case of the spectral combination, however, there is an additional spectral splitting of the input signal. Combinations of both methods are possible. In addition, the temporal phase position of the individual beams is of fundamental importance, which must match in the sub-wavelength range. In some cases, it can be ensured by way of the structure that this condition is fulfilled throughout. Otherwise, active stabilization of the phase positions may be necessary. Moreover, in pulsed operation, the temporal overlap of the individual pulses, which is as exact as possible, in the combination must be ensured. A deviation results in a reduction in the combination efficiency. In the case of the spectrally identical combination, it is additionally necessary for the individual pulses in the channels themselves to have identical phase or amplitude profiles, if possible. Deviations can here likewise result in a reduction of the combination efficiency.

Known are different approaches for components for beam splitting and combination for spatially separated amplification.

Using 1:2 beam splitters, for example, beams can be split and combined.

A 1:2 beam splitter can be realized using a polarization-dependent beam splitter or a partially reflective surface. A 1:N split is implementable by way of cascading with a plurality of said beam splitters. It is thus possible to produce N partial beams. The same principle can also be used for the combination, i.e. the superposition of a plurality of partial beams in one output beam. The disadvantage is that the scalability of the number of channels is made more difficult by the quantity of the necessary elements (1:2 beam splitter). For example, 31 1:2 beam splitters are necessary for a 1:32 beam splitter.

A 1:N beam splitter can alternatively be realized as a monolithic diffractive element. However, the individual partial beams have an angular dispersion which is not identical for the different beams. The varying angular dispersion must be eliminated when using ultrashort pulses by matched compensation elements in each case. This can likewise lead to a high number of necessary elements and make scaling to a high channel number more difficult. This approach is therefore likewise very complicated.

It is the object of the invention to provide an improved optical array which makes possible effective and simple splitting of a light beam, in particular of a laser beam with pulsed or continuous radiation.

The invention achieves this object starting from an optical array of the type mentioned in the introductory part by way of the splitting element and/or the combining element in each case having a partially reflective element which reflects the radiation of the input beam or the output beam two or more times, wherein the partially reflective element has zones of different reflectivity, wherein the at least one optical element is an optical amplifier or a nonlinear optical element for spectral broadening.

The invention provides a compact array for overcoming the above-described limitations. The input beam is split into multiple partial beams, with the result that a plurality of channels can be used for the radiation to be propagated, rather than a single optical element which exhibits the described limitations. Said channels are arranged in a configuration in which the optical and thermal coupling of the channels is low or even negligibly small, that is to say they are independent.

According to one possible configuration, two or more spatially separate optical elements are provided, wherein in each case one of the partial beams propagates through each of the optical elements. For example, in the case of a laser amplifier, a plurality of amplifiers can be arranged to be spatially separated, wherein in each case one of the partial beams propagates through each gain medium.

In another possible embodiment, a plurality of optical elements are integrated into a single monolithic optical element (multichannel element). The partial beams propagate in a spatially separated manner through the optical element. In one laser amplifier, the pump radiation can be guided in the respective channels, in multiple separate pump channels or in a common pump channel.

According to the invention, the input beam is split with the aid of a compact splitting element. Thereafter, the partial beams propagate in the individual channels and are subsequently recombined into the output beam using the combining element.

Owing to the independence of the individual channels, the above-mentioned limitations apply individually to each of the channels. The invention allows a quasi arbitrary scaling with a conceivably low outlay. In the case of N channels, scaling of the average power and pulse peak power by the same factor N is possible.

Owing to the invention, a compact and angular-dispersion-free splitting and combining element for splitting and combining the radiation is proposed. It is particularly suitable for use in connection with ultrashort laser pulses owing to said properties.

The splitting element and the combining element are preferably configured to be identical, such that the splitting and the combining of the radiation take place symmetrically.

According to the invention, the splitting element and/or combining element each have a partially reflective element which reflects the radiation of the input beam or the output beam two or more times, wherein the partially reflective element has zones of different reflectivity.

In other words, the radiation of the input beam or the output beam is successively reflected at the different zones of the partially reflective elements, i.e. with a different reflectivity in each partial reflection step. For example the reflectivity of the zones of the partially reflective element along one direction located in the reflection plane of the radiation here becomes smaller or greater depending on whether the element is the splitting element or the combining element. The different (decreasing or increasing) reflectivity effects that for example in the splitting element, each partial beam which is produced in one of the successively effected partial reflection steps as a non-reflected portion of the input beam attains a specific, preferably identical intensity.

Expediently, the splitting element and/or the combining element furthermore have in each case a reflective element, wherein the radiation in that case is reflected to and fro multiple times between the partially reflective and the reflective element. Here, the surface of the reflective element can be plane-parallel to the surface of the partially reflective element. Expediently, the radiation strikes the partially reflective element obliquely, i.e. at an angle which deviates from 90°, such that the partial beams after splitting propagate in a common plane, parallel and at equal distance. The angle of incidence is here to be selected such that the radiation is partially reflected successively at the zones of different reflectivity.

In the optical array according to the invention, a phase matching element is preferably provided in the beam direction upstream or downstream of the optical element, which phase matching element influences the phase of the radiation of at least one partial beam. By way of suitable phase matching elements, in each case varying phase shifts occurring in the individual channels can be compensated for so as to permit a phase-correct superposition of the partial beams in the output beam. Here, a control loop can be provided, in which the phase of the radiation of the at least one partial beam is the set variable. Properties of the output beam (for example average power, pulse peak power), which are detected appropriately, can be the control variable. In this way, phase shifts in the individual channels can be compensated for automatically.

The underlying object is also achieved according to the invention by way of a system having a laser radiation source, which emits an input beam, and an optical array, having
  a splitting element which splits the input beam into at least two partial beams,
  at least one optical element, through which at least one of the partial beams propagates, and
  at least one combining element which spatially superimposes the partial beams in one output beam. The system is characterized in that the splitting element and/or the combining element each have a partially reflective element which reflects the radiation of the input beam or the output beam two or more times, wherein the partially reflective element has zones of different reflectivity, wherein the at least one optical element is an optical amplifier or a nonlinear optical element for spectral broadening.

By way of example, the laser radiation source of the system according to the invention can be a continuous wave laser, wherein the power of the laser radiation of the continuous wave laser in each partial beam is amplified by optical amplification to at least 100 W, preferably to at least 500 W, highly preferably to at least 1 kW. The continuous wave radiation is here split into multiple partial beams by way of the splitting element. The partial beams are then amplified in the cores of an optically pumped multicore fiber, which is doped with, for example, erbium or ytterbium, as the optical element within the meaning of the invention, and subsequently recombined by the combining element. The power range can here be assumed to be an output power of 1 kW per core of the multicore fiber. After combination of the partial beams, in the optimal case this leads to an output power of the system of N times 1 kW (N=number of cores of the multicore fiber).

Alternatively, the laser radiation source of the system according to the invention can be a short-pulse laser, which emits laser pulses having a pulse duration of less than 1 ps (for example in the range of 100 fs). The pulse energy of the laser pulses at the output of the at least one optical element can here in each partial beam be at least 0.1 mJ, preferably at least 0.5 mJ, highly preferably at least 1 mJ.

By way of example, the system in this configuration is suitable for amplifying temporally stretched femtosecond pulses. Here, an optically pumped, doped multicore fiber (which is doped, for example, with erbium or ytterbium) having a plurality of signal cores can be used here as the optical element, wherein the laser pulses are split and recombined by the splitting element according to the invention. By way of example, laser pulses having a stretched pulse duration of 1 ns in each core can be amplified to 1 mJ of pulse energy, which, after combination, gives a pulse energy of up to N times 1 mJ. For the temporal stretching (in the input beam) and, if appropriate, compression (in the output beam), the system according to the invention can have suitable dispersive elements (for example prism or grating arrays).

The system according to the invention is likewise suitable for spectral broadening of femtosecond pulses, for example in an optical element in the form of a hollow-core fiber having a plurality of cores. Spectral broadening (for example from 20 nm bandwidth to 100 nm bandwidth) occurs separately in each core. Here, splitting and combination take place with the optical array according to the invention. For example, laser pulses having a pulse energy of 1 mJ and a pulse duration of 200 fs (per core) can thus be spectrally broadened. However, it would not be possible to reach the combined pulse energy of N times 1 mJ using a single core owing to ionization. However, this is possible without ionization using the optical array according to the invention (splitting, multicore hollow-core fiber, combination).

Exemplary embodiments of the invention will be explained below with reference to the drawings, in which.

The splitting element 1 shown in the figures comprises two elements, specifically a partially reflective element 2 and a reflective element 3. The reflective element 3 is a mirror having as high a reflectivity as possible. The partially reflective element 2 reflects part of the radiation E that is incident (for example from a pulse laser). The non-reflected part is transmitted and produces a partial beam. The partially reflective element 2 consists of N (in the exemplary embodiments illustrated, N=4) zones a, b, c, d having different reflectivity. These can be selected in each case for the partial beams T1 to TN. The beams take the path that is illustrated in the figures. The input beam E is reflected to and fro multiple times between the partially reflective element 2 and the plane-parallel reflective element 3, which is arranged opposite thereto and at a distance therefrom. The reflectivities of zones a, b, c, d of the partially reflective element 2 are selected such that the incident input beam E is split at a specific ratio into the N partial beams. For splitting the input beam E into identical parts for all partial beams, for example (in the case of N=4), the reflectivities $R_a$, $R_b$, $R_c$, $R_d$ of the zones a, b, c, d should be selected as follows: $R_a$=75%, $R_b$=66%, $R_c$=50%, $R_d$=0%. The produced partial beams T1 to T4 are here parallel and equidistant. This can be different in a different array of partially reflective element 2 and reflective element 3 or in another design of said elements.

Figure 1:
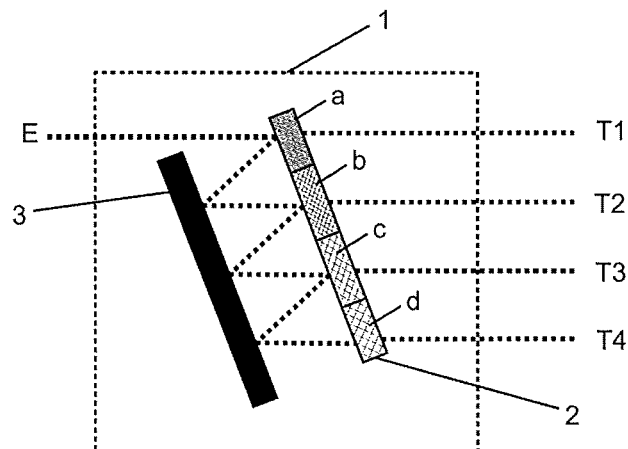
FIG. 1 shows a schematic illustration of an optical splitting element according to the invention.
Figure 2:
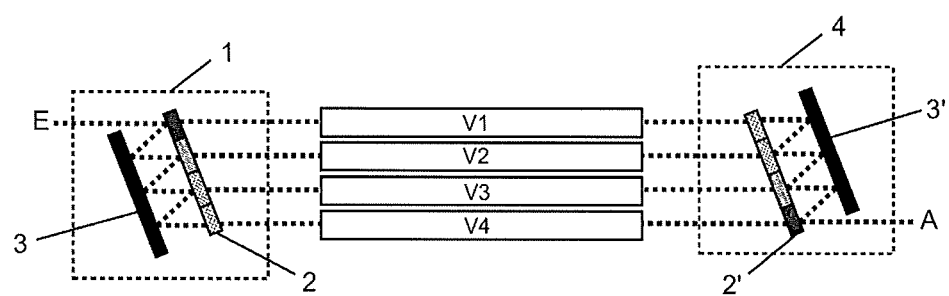
FIG. 2 shows a schematic illustration of an optical array according to the invention having a plurality of separate optical elements.
Figure 3:
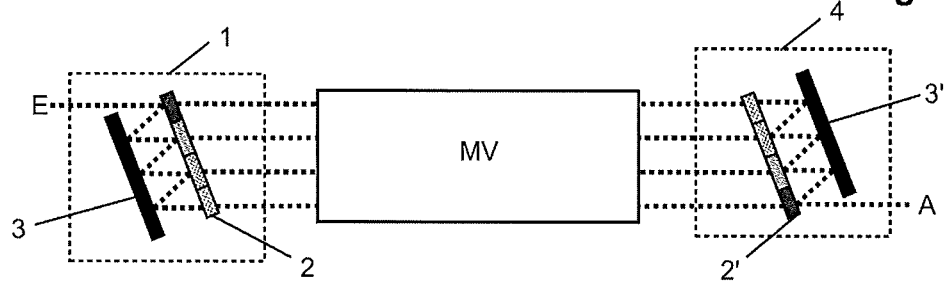
FIG. 3 shows an optical array according to the invention having a monolithic optical element.
Figure 4:
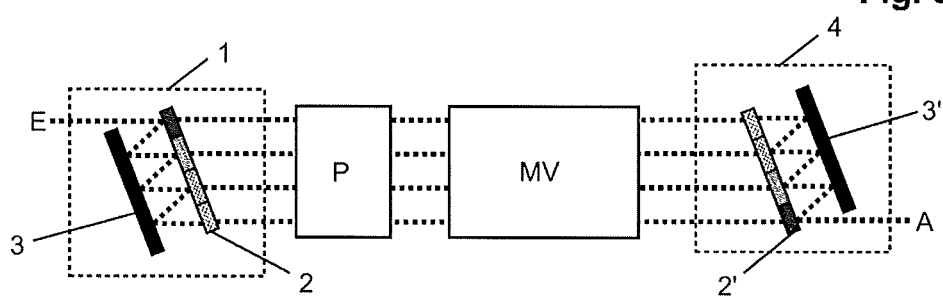
FIG. 4 shows an optical array according to the invention having a phase matching element.

In the arrays of FIGS. 2 to 4, in each case one splitting element 1 according to FIG. 1 and a combining element 4 are provided, which has the same construction as partially reflective element 2' and reflective element 3'. The combining element 4 superposes the partial beams T1 to TN in one output beam A. It is arranged antisymmetrically with respect to the splitting element 1 in this case such that the resulting path length differences of N partial beams T1 to TN cancel each other out exactly. Owing to the integration of the 1:N split or combination in in each case a single element 1 or 4, a compact construction is possible and simple adjustment is ensured. In addition, there is no angle dependence of the partial beams T1 to TN on the wavelength. The element is thus also suitable for spectrally broadband radiation and thus for use for ultrashort laser pulses.

In the exemplary embodiment of FIG. 2, N spatially separate optical elements V1 to VN are provided. The input beam E is split using the splitting element 1 into N partial beams, which in each case propagate in the corresponding channels of the optical elements V1 to VN. By way of example, the optical elements V1 to VN can be individual fiber amplifiers (for example optically pumped optical fibers doped with rare earth ions). After the N partial beams have propagated through the optical elements V1 to VN, they are combined in the combining element 4 to form output beam A.

In the exemplary embodiment of FIG. 3, the incoming input beam E is in turn split, using the splitting element 1, into N partial beams which propagate in each case in the corresponding channels of a monolithic multichannel element MV as the optical element. The optical element MV can be, for example, a multicore fiber, or a volume-optical amplifier. After the N partial beams have propagated through the optical element MV, they are combined in the combining element 4 to form output beam A.

FIG. 4 shows an exemplary embodiment with additional phase matching element P. The latter serves for compensating phase differences of the individual partial beams, with the result that, when combining them in the combining element 4, the phase difference is minimized and the output power of the combined beam A is maximized. Control of the phase matching element P can be effected manually or as part of an active regulation for stabilizing the output power. The phase matching element P can comprise mechanically movable elements, such as for example mirrors, displaceable by piezo actuation, or movable transmission wedges. Acousto-optic or electro-optic modulators (AOM or EOM) are likewise usable. They can also be integrated in the optical element MV.

Corresponding phase matching elements can also be provided in the individual channels in the case of the solution according to FIG. 2.

When using a monolithic multichannel element MV according to FIGS. 3 and 4, in many cases it is possible to ensure efficient and temporally stable recombination of the beam only with the aid of static phase shifters, since external influences, for example thermal changes and mechanical oscillations, in the ideal case impact all channels identically, and the relative phase positions of the partial beams are thus maintained.

The invention claimed is:

1. An optical array, comprising:
   a splitting element which splits an input beam into at least two partial beams,
   an optical element through which at least one of the partial beams propagates, and
   a combining element which spatially superposes the partial beams in one output beam, wherein the combining element is arranged antisymmetrically with respect to the splitting element in such a way that path length differences of the at least two partial beams cancel out,
   further wherein of the splitting element has a first partially reflective element and the combining element has a second partially reflective element,
   wherein the first partially reflective element and the second partially reflective element reflect the radiation of the input beam and the output beam at least two times,
   further wherein the first and second partially reflective elements have zones of different reflectivity,
   and the optical element is one of an optical amplifier or a nonlinear optical element for spectral broadening.

2. The optical array as claimed in claim 1, wherein the reflectivity of the zones of the first and second partially reflective elements is along a direction located in the reflection plane of the radiation decreases or increases.

3. The optical array as claimed in claim 1, wherein the splitting element comprises a first reflective element and the combining element comprises a second reflective element, wherein the radiation is reflected between the first and second partially reflective elements and the first and second reflective elements.

4. The optical array as claimed in claim 3, wherein the surfaces of the first and second reflective elements is are plane-parallel to the surfaces of the first and second partially reflective elements.

5. The optical array as claimed in claim 1, wherein the radiation strikes the first and second partially reflective elements at an angle which deviates from 90°.

6. The optical array as claimed in claim 1, wherein the partial beams propagate in a common plane, parallel and with equal distance.

7. The optical array as claimed in claim 1, wherein the partial beams propagate in a spatially separated manner through the optical element.

8. The optical array as claimed in claim 7, wherein the optical element is a multicore fiber having a plurality of spatially separate waveguide structures, wherein each waveguide structure guides one of the partial beams.

9. The optical array as claimed in claim 1, further comprising at least two spatially separate optical elements corresponding to the at least two partial beams, wherein the partial beams propagate through the corresponding optical elements.

10. The optical array as claimed in claim 9, wherein the optical elements are optical fibers, wherein each optical fiber guides one of the partial beams.

11. The optical array as claimed in claim 1, further comprising a phase matching element which is arranged in a beam direction, said beam direction one of upstream or downstream of the optical element, wherein said beam direction influences the phase of the radiation of at least one of the partial beams.

12. The optical array as claimed in claim 11, further comprising a control loop, in which the phase of the radiation of the partial beams is a set variable.

13. A system, comprising:
    a laser radiation source, which emits an input beam, and
    an optical array, comprising:
      a splitting element which splits an input beam into at least two partial beams,
      an optical element through which at least one of the partial beams propagates, and
      a combining element which spatially superposes the partial beams in one output beam, wherein the combining element is arranged antisymmetrically with respect to the splitting element in such a way that path length differences of the at least two partial beams cancel out,
      further wherein at least one of the splitting element has a first partially reflective element and the combining element has a second partially reflective element,
      wherein the first partially reflective element and the second partially reflective element reflect the radiation of the input beam and the output beam at least two times,
      further wherein the first and second partially reflective elements have zones of different reflectivity,
      and the optical element is one of an optical amplifier or a nonlinear optical element for spectral broadening.

14. The system as claimed in claim 13, wherein the laser radiation source is a continuous wave laser, wherein the power of the laser radiation of the continuous wave laser in each partial beam is amplified by way of optical amplification to at least 100 W.

15. The system as claimed in claim 14, wherein the power of the laser radiation of the continuous wave laser in each partial beam is amplified by way of optical amplification to at least 500 W.

16. The system as claimed in claim 14, wherein the power of the laser radiation of the continuous wave laser in each partial beam is amplified by way of optical amplification to at least 1 kW.

17. The system as claimed in claim 13, wherein the laser radiation source is a short pulse laser, wherein the pulse energy of the short pulse laser pulses at the output of the optical element in each partial beam is at least 0.1 mJ.

18. The system as claimed in claim 17, wherein the pulse energy of the short pulse laser pulses at the output of the one optical element in each partial beam is at least 0.5 MJ.

19. The system as claimed in claim 17, wherein the pulse energy of the short pulse laser pulses at the output of the optical element in each partial beam is at least 1 mJ.

* * * * *